United States Patent
Golubkov (10) Patent No.: US 11,260,725 B2
(45) Date of Patent: Mar. 1, 2022

(54) METHOD AND SYSTEM FOR PREVENTING INGESTION OF CONTAMINATED AMBIENT AIR INTO A PASSENGER COMPARTMENT OF A VEHICLE

(71) Applicant: Samsung SDI Co., Ltd., Yongin-si (KR)

(72) Inventor: Andrej Golubkov, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 242 days.

(21) Appl. No.: 16/743,508

(22) Filed: Jan. 15, 2020

(65) Prior Publication Data
US 2020/0238793 A1    Jul. 30, 2020

(30) Foreign Application Priority Data

Jan. 24, 2019  (EP) ..................................... 19153443
Jan. 7, 2020  (KR) ........................ 10-2020-0002177

(51) Int. Cl.
*B60H 1/00* (2006.01)
*B60H 1/24* (2006.01)

(52) U.S. Cl.
CPC ..... *B60H 1/00978* (2013.01); *B60H 1/00007* (2013.01); *B60H 1/00278* (2013.01); *B60H 1/24* (2013.01); *B60H 1/248* (2013.01)

(58) Field of Classification Search
CPC ............ B60H 1/00978; B60H 1/00007; B60H 1/00278; B60H 1/24; B60H 1/248; B60H 1/00392; B60H 1/008; B60H 1/00849
See application file for complete search history.

(56) References Cited

U.S. PATENT DOCUMENTS

| | | | |
|---|---|---|---|
| 6,672,085 B1 * | 1/2004 | Sangwan | B60H 1/008 62/126 |
| 8,846,232 B2 | 9/2014 | Tse | |
| 9,914,336 B2 | 3/2018 | Smith | |

(Continued)

FOREIGN PATENT DOCUMENTS

| | | |
|---|---|---|
| CN | 104417380 A | 3/2015 |
| CN | 106684503 A | 5/2017 |

(Continued)

OTHER PUBLICATIONS

Rod: "When to Use the Car's Recirculation Button—World Class Auto Repair", Jul. 30, 2014 XP055796793, Retrieved from the Internet:URL:https://.web.archive.archive.org/web/20150328034751/ https://worldclassautoservice.com/use-cars-recirculation-button/ [retrieved on Apr. 19, 2021].

(Continued)

*Primary Examiner* — Emmanuel E Duke
(74) *Attorney, Agent, or Firm* — Lewis Roca Rothgerber Christie LLP (57) ABSTRACT

Embodiments of the present invention are directed to a method and system for preventing ingestion of ambient air contaminated with possibly harmful, toxic, or flammable battery gases into a passenger compartment of a vehicle in the event of a battery failure. If an abnormal state is detected in a battery pack of the vehicle, the vehicle automatically switches the HVAC system to air recirculation mode, thereby preventing any toxic gas emitted from the battery pack from entering the passenger compartment.

15 Claims, 4 Drawing Sheets

(56) References Cited

U.S. PATENT DOCUMENTS

| | | | | |
|---|---|---|---|---|
| 2008/0183334 A1* | 7/2008 | Greiner | ............ | B60H 1/00964 |
| | | | | 700/276 |
| 2009/0023056 A1 | 1/2009 | Adams et al. | | |
| 2012/0302149 A1* | 11/2012 | Zhu | .................. | H01M 10/6565 |
| | | | | 454/75 |
| 2015/0065026 A1* | 3/2015 | Dawson | ................ | H01M 10/52 |
| | | | | 454/75 |
| 2019/0070924 A1* | 3/2019 | Mancini | ............ | B60H 1/00907 |

FOREIGN PATENT DOCUMENTS

| EP | 2 887 446 B1 | 1/2017 |
|---|---|---|
| KR | 10-2016-0104867 A | 9/2016 |

OTHER PUBLICATIONS

European Office action issued in corresponding application No. EP 19153443.7, dated Apr. 23, 2021, 6 pages.
European Search Report corresponding to European App No. 19153443.7 dated Mar. 13, 2019, 9pp.

\* cited by examiner

FIG. 1

RELATED ART

METHOD AND SYSTEM FOR PREVENTING INGESTION OF CONTAMINATED AMBIENT AIR INTO A PASSENGER COMPARTMENT OF A VEHICLE

CROSS-REFERENCE TO RELATED APPLICATION

This application claims priority to and the benefit of Korean Application No. 10-2020-0002177, filed in the Korean Patent Office on Jan. 7, 2020, and European Patent Application No. 19153443.7, filed in the European Patent Office on Jan. 24, 2019, the entire contents of which are incorporated herein by reference.

BACKGROUND

1. Field

Aspects of embodiments of the present invention relate to a method and system for preventing ingestion of contaminated ambient air into a passenger compartment of a vehicle in the event of a battery failure.

2. Related Art

In recent years, vehicles for transporting goods and people have been developed that use electric power as a source (e.g., a power source) for motion. Such electric vehicles are automobiles that are propelled by an electric motor using energy stored in rechargeable (or secondary) batteries. An electric vehicle may be solely powered by batteries or may be a hybrid vehicle powered by, for example, a gasoline generator. Furthermore, an electric vehicle may include a combination of an electric motor and a conventional combustion engine.

Generally, an electric-vehicle battery (EVB) (or traction battery) is a battery used to power the propulsion of battery electric vehicles (BEVs). Electric-vehicle batteries differ from starting, lighting, and ignition batteries in that they are designed to output power over sustained periods of time.

Further, a rechargeable (or secondary) battery differs from a primary battery in that it is designed to be repeatedly charged and discharged, while the latter provides an irreversible conversion of chemical to electrical energy. Low-capacity rechargeable batteries may be used as power supplies for small electronic devices, such as cellular phones, notebook computers, and camcorders, while high-capacity rechargeable batteries may be used as a power supply for hybrid vehicles and the like.

Rechargeable batteries generally include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery (e.g., of the electrode assembly) via an electrochemical reaction between the positive electrode, the negative electrode, and the electrolyte solution. The shape of the case, such as cylindrical or rectangular, may be varied according to the battery's desired purpose. Lithium-ion (and similar lithium polymer) batteries, widely known via their use in laptops and consumer electronics, are the dominate battery chemistry in the most recent electric vehicles in development.

A battery module may include a plurality of rechargeable unit battery cells coupled to each other in series and/or in parallel to provide high energy density for, as an example, motor driving of a hybrid vehicle. For example, the battery module may be formed by interconnecting the electrode terminals of the plurality of unit battery cells to each other, with the number of unit battery cells depending on a desired amount of power, to provide a high-power rechargeable battery.

A battery pack is a set of any number of (preferably identical) battery modules. The battery modules may be configured in series, parallel, or a mixture of both to deliver the desired voltage, capacity, and/or power density. Components of a battery pack include the individual battery modules and interconnects, which provide electrical conductivity between the battery modules.

Static control of battery power output and charging may not be sufficient to meet the dynamic power demands of various electrical consumers connected to the battery system. Thus, steady exchange of information between the battery system and the controllers of the electrical consumers may be employed. Such information includes the battery system's actual state of charge (SoC), potential electrical performance, charging ability, and internal resistance as well as actual or predicted power demands or surpluses of the consumers.

Battery systems usually include a battery management system (BMS) and/or a battery management unit (BMU) for processing the aforementioned information. The BMS/BMU may communicate with the controllers of the various electrical consumers via a suitable communication bus, such as a SPI or CAN interface. The BMS/BMU may further communicate with each of the battery submodules, such as with a cell supervision circuit (CSC) of each battery submodule. The CSC may be further connected to a cell connection and sensing unit in the respective battery submodule that interconnects the battery cells of the battery submodule.

Thus, the BMS/BMU is provided to manage the battery pack, such as by protecting the battery pack from operating outside its safe operating area, monitoring its state, calculating secondary data, reporting that data, controlling its environment, authenticating it, and/or balancing it.

A thermal management system may be included to ensure safe use of the at least one battery module by efficiently emitting, discharging, and/or dissipating heat generated by its rechargeable batteries. If the heat emission/discharge/dissipation is not sufficiently performed, temperature deviations occur between respective battery cells, such that the at least one battery module may not generate a desired amount of power. In addition, an increase of the internal temperature within a battery cell can lead to abnormal reactions occurring therein. Then, not only the charging and discharging performance of the rechargeable battery may deteriorate and the life-span of the rechargeable battery shortened, but in the event of a serious battery failure, a so-called "thermal runaway" may occur, which may lead to the ejection (or emission) of possibly harmful substances from inside the affected battery cells as further described below. Thus, a cell cooling system for effectively emitting/discharging/dissipating heat from the battery cells may be installed in (or for) the battery pack or module(s).

Most automotive Li-ion battery packs include a plurality of cell modules. Generally, an automotive cell module includes a plurality of stacked battery cells. To achieve a desired capacity and voltage, busbars electrically connect the battery cells to each other in series and/or in parallel. The modules may be further connected to each other in series to provide a battery pack outputting a desired system voltage.

When a battery cell is heated above a critical temperature (for example, above about 150° C.), it may undergo a thermal runaway. The initial heating may be caused by a local failure, such as a cell internal short circuit, heating from a bad electrical contact, a short circuit to a neighboring cell, or the like. Upon occurrence of a thermal runaway, the failed cell(s) may heat up such that the cell temperatures rise to higher than about 700° C. During the thermal runaway, large quantities of hot gas are ejected (or emitted) from inside the failed cell(s) through the vent opening of the cell into the battery pack and from the battery pack to the outside of the car (as vent-gas). Generally, the primary components of vent-gas are hydrogen ($H_2$), carbon dioxide ($CO_2$), carbon monoxide (CO), electrolyte vapor, and other hydrocarbons. Therefore, vent-gas is flammable and potentially toxic.

If the passenger compartment of the vehicle is equipped with a heating, ventilation, and air conditioning (HVAC) system, the vent-gas emitted to the ambient air as a result of a thermal runaway in the vehicle's battery pack may be ingested by the HVAC system through an air inlet and then guided into the passenger compartment, thereby exposing passengers to dangerous chemicals and vapors due to the above-mentioned properties of the vent-gas.

Therefore, there is a need for a method and a system for preventing the ingestion, by an HVAC system, of ambient air contaminated with possibly harmful, toxic, or flammable battery gases ("vent-gas") into a passenger compartment of a vehicle in case of a battery failure.

SUMMARY

One or more drawbacks of the prior art may be avoided or at least mitigated according to embodiments of the present invention, which provide a method as well as a corresponding system for preventing the ingestion, by an HVAC system, of ambient air that may be contaminated with possibly harmful, toxic, or flammable battery gases ("vent-gas") into a passenger compartment of a vehicle in case of a battery failure. According to some embodiments of the present invention, the heating, ventilation, and air conditioning system (throughout the following disclosure, referred to as the "HVAC system") of a vehicle's passenger compartment may be switched into a recirculation mode upon detection of a serious battery failure.

One embodiment of the present invention is directed to a method for preventing the ingestion of contaminated ambient air into a passenger compartment of an electric or hybrid vehicle. The vehicle includes: a passenger compartment; a battery pack including a plurality of batteries; a battery management unit; a central control unit; and an HVAC system for the passenger compartment. The HVAC system includes: an HVAC control unit, an outside inlet configured to ingest ambient air, an air inflow channel; and an inside inlet configured to ingest air from inside of the passenger compartment. The method includes: detecting, by the battery management unit, whether at least one of the batteries of the battery pack is in or enters into an abnormal or dangerous state; transmitting, by the battery management unit, a first signal to the central control unit upon the detection of the abnormal or dangerous state; transmitting, by the central control unit upon receiving the first signal, a second signal to the HVAC control unit; and switching, by the HVAC control unit upon receiving the second signal and when the air inflow channel is connected to the outside inlet, the air inflow channel from being connected to the outside inlet to being connected to the inside inlet.

For example, upon the detection of an abnormal or dangerous state, such as a thermal runaway of at least one of the battery cells, the HVAC system, according to the above-described example method, switches into an air recirculation mode in which only air that is already inside the passenger compartment is drawn in by the HVAC system and then again supplied to the passenger compartment. An exchange with ambient air—which may be mixed with possibly harmful vent-gas ejected (or emitted) by the battery pack—is thus avoided.

The detection of the abnormal or dangerous state (such as a thermal runaway) of battery cells may be performed by, for example, measuring the temperature and/or the voltage of the battery pack, the battery module(s), and/or the battery cell(s). Another method of detecting the abnormal or dangerous state (such as a thermal runaway) of battery cell(s) includes measuring the pressure and/or gas composition inside the battery pack.

According to one embodiment, the method may further include stopping, after the switching of the air inflow channel to the inside inlet, the HVAC system. This has the advantage of saving energy.

In one embodiment, the method may further include sending, by the central control unit after receiving the first signal, a third signal to an HVAC system of the battery pack, which may be different from the afore-mentioned HVAC system connected to the passenger compartment. Upon receiving the third signal, the HVAC system of the battery pack may start cooling the batteries.

In one embodiment, the method may further include sending, by the central control unit after receiving the first signal, the third signal to an extinction system to extinguish any possible fire in the battery pack. The sending of the third signal to the extinction system may be performed alternatively to or additional to the sending of the third signal to the HVAC system of the battery pack.

According to one embodiment, the method may further include, after detecting that at least one of the batteries of the battery pack is in or is entering into an abnormal or dangerous state, activating an alarm in the passenger compartment. The alarm outputted in the passenger compartment may be a visible (e.g., optical) alarm. Alternatively or additionally, the alarm outputted in the passenger compartment may be an audible (e.g., acoustic) alarm.

According to another embodiment of the present invention, a system for preventing the ingestion of contaminated ambient air into a passenger compartment of a vehicle including a battery pack including a plurality of batteries is provided. The system includes: a battery management unit; a central control unit; and an HVAC system for the passenger compartment. The HVAC system includes: an HVAC control unit, an outside inlet configured to ingest ambient air; an air inflow channel; and an inside inlet configured to ingest air from an interior of the passenger compartment. The HVAC system is configured to be switched between a state of being connected to the outside inlet and a state of being connected to the inside inlet. Further, the battery management unit is configured to detect when at least one of the batteries of the battery pack is in or enters into an abnormal or dangerous state and to transmit, upon detection of the abnormal or dangerous state, a first signal to the central control unit. The central control unit is configured to transmit, upon receiving the first signal, a second signal to the HVAC control unit, and the HVAC control unit is configured to switch, upon receiving the second signal and when the air inflow channel is connected to the outside inlet, the air inflow channel from being connected to the outside inlet to being connected to the inside inlet.

For example, the system is configured such that, upon detection of an abnormal or dangerous state (e. g., a thermal runaway) of at least one of the battery cells, the HVAC system switches into an air recirculation mode in which only air that is already inside the passenger compartment is drawn in by the HVAC system and then again supplied to the passenger compartment. An exchange with ambient air—which may be mixed with possibly harmful vent-gas ejected by the battery pack—is thus avoided.

The detection of the abnormal or dangerous state (such as a thermal runaway) of battery cells may be performed by, for example, measuring the temperature and/or the voltage of the battery pack, the battery module(s), and/or the battery cell(s). Another method of detecting the abnormal or dangerous state (such as a thermal runaway) of battery cell(s) includes measuring the pressure and/or gas composition inside the battery pack.

In one embodiment, the HVAC system may further include a switch in the air inflow channel and configured to switch the air inflow channel between being connected to the outside inlet and being connected to the inside inlet.

In one embodiment, the switch may be a switch valve, and the switch valve may be a switchable air valve.

In one embodiment, the switch may include: a first valve configured to open and close a connection of the outside inlet to the air inflow channel; and a second valve configured to open and close a connection of the inside inlet to the air inflow channel. In one state of the switch, the first valve may be opened to connect the outside inlet to the air inflow channel and the second valve maybe closed to cease connection of the inside inlet to the air inflow channel. In another state of the switch, the first valve may be closed to cease connection of the outside inlet to the air inflow channel and the second valve may be opened to connect the inside inlet to the air inflow channel.

In one embodiment, the HVAC system may further include a filter. The filter may be configured to filter pollutants and/or toxic substances out of the air drawn into the air inflow channel.

In one embodiment, the HVAC system may further include a fan configured to suck air into the air inflow channel.

In one embodiment, the HVAC system may further include a ventilation outlet configured to supply air into the passenger compartment from the air inflow channel.

In one embodiment, the HVAC control unit may be configured to stop the HVAC system after a connection of the air inflow channel to the inside inlet has been established in response to the detection of an abnormal or dangerous state. This has the advantage of saving energy.

In one embodiment, the battery pack may include an HVAC system, and the HVAC system of the battery pack may be configured to receive a signal from the central control unit and to cool, after receiving a signal from the central control unit, the batteries.

In one embodiment, the battery pack may include an extinction system, and the extinction system of the battery pack may be configured to receive a signal from the central control unit and to extinguish any possible fire in the battery pack.

In one embodiment, the system may further include an alarm in the passenger compartment. The alarm may be configured to output, after the detection of at least one of the batteries of the battery pack being in or entering into the abnormal or dangerous state, an alarm in the passenger compartment.

In one embodiment, the alarm may be configured to output a visible alarm.

In one embodiment, the alarm may be configured to output an audible alarm.

Further aspects and features of the present invention may be learned from the following description of example embodiments thereof.

BRIEF DESCRIPTION OF THE DRAWINGS

Aspects and features of the present invention will become apparent to those of ordinary skill in the art by describing, in detail, exemplary embodiments thereof with reference to the attached drawings in which.

DETAILED DESCRIPTION

Reference will now be made in detail to embodiments, examples of which are illustrated in the accompanying drawings. Aspects and features of the exemplary embodiments, and implementation methods thereof, will be described with reference to the accompanying drawings. The present invention, however, may be embodied in various different forms and should not be construed as being limited to the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

In the drawings, like reference numerals denote like elements, and redundant descriptions thereof may be omitted. Further, the relative sizes of elements, layers, and regions in the drawings may be exaggerated for clarity.

The terminology used herein is for the purpose of describing particular embodiments and is not intended to be limiting of the present invention. As used herein, the singular forms "a" and "an" are intended to include the plural forms as well, unless the context clearly indicates otherwise. Expressions, such as "at least one of," when preceding a list of elements, modify the entire list of elements and do not modify the individual elements of the list. As used herein, the term "and/or" includes any and all combinations of one or more of the associated listed items. Further, the use of "may" when describing embodiments of the present invention refers to "one or more embodiments of the present invention."

It will be understood that although the terms "first," "second," etc. are used to describe various elements, these elements should not be limited by these terms. These terms are only used to distinguish one element from another element. For example, a first element may be named a second element and, similarly, a second element may be named a first element, without departing from the scope of the present invention.

It will be further understood that the terms "include," "comprise," "including," "comprising," "has," "having," and variations thereof specify a property, a region, a fixed number, a step, a process, an element, a component, and/or a combination thereof but do not exclude other properties, regions, fixed numbers, steps, processes, elements, components, and/or combinations thereof.

It will be understood that when an element or layer is referred to as being "on," "connected to," or "coupled to" another element, it can be directly on, connected to, or coupled to the other element, or one or more intervening elements may be present. In addition, it will also be understood that when an element is referred to as being "between" two elements, it can be the only element between the two elements, or one or more intervening elements may also be present.

The electronic (or electric) devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
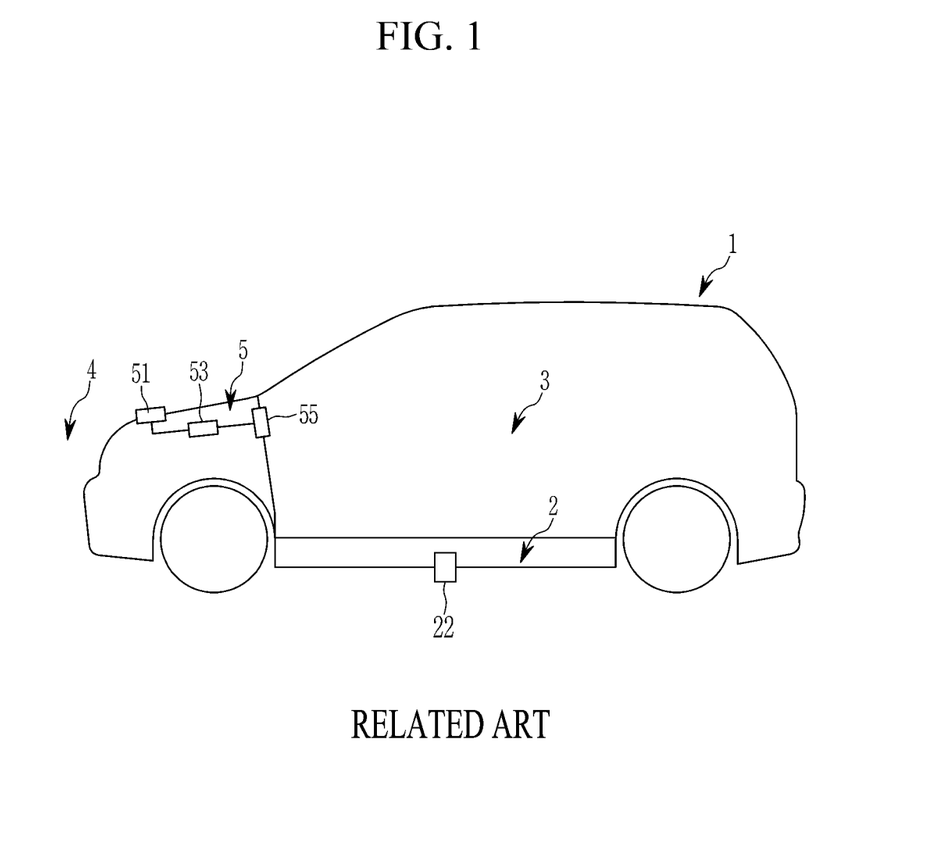
FIG. 1 is a schematic illustration of an electric or hybrid vehicle with an HVAC system for the passenger compartment according to the related art.

FIG. 1 is a schematic illustration of an electric or hybrid vehicle including an HVAC system for the passenger compartment according to the related art. The vehicle 1, for example, a car, includes a passenger compartment 3. The heating, ventilation, and/or air conditioning of the passenger compartment 3 is controlled by a so-called "heating, ventilation, and air conditioning system" (referred to as an "HVAC system" throughout the present specification).

The HVAC system 5 includes an outside inlet (e.g., an outside air inlet) 51 for ingesting ambient air 4 from the outside of the vehicle. The ingestion is performed, for example, via an air pump, ventilator, or fan 53 suitable for sucking air. The air ingested from the outside is then supplied to the passenger compartment 3 via an air inflow channel and a ventilation outlet 55. The air inflow channel is an air channel that carries air in the HVAC system (e.g., that carries air between the outside inlet 51 and the ventilation outlet 55.

A battery pack 2 as described in the introductory part of the specification is arranged in the bottom area of the electric or hybrid vehicle 1. The battery pack 2 is controlled and monitored by a battery management unit (BMU). A venting port 22 is arranged, for example, on the bottom side of the vehicle 1 to enable ventilation or air exchange of the battery pack 2 with ambient air 4.

When a thermal runaway or even a battery fire occurs, large volumes of potentially harmful combustion gas ("vent-gas") are emitted by the battery pack 2 through the venting port 22 into the ambient air 4. The vent-gas may be ingested by the HVAC system 5 of the vehicle 1 from the outside through the outside inlet 51 and the fan 53 and released into the inside of the vehicle 1 into the passenger compartment 3 through the ventilation outlet 55. The vent-gas may be harmful to passengers inside the passenger compartment 3.

Figure 2:
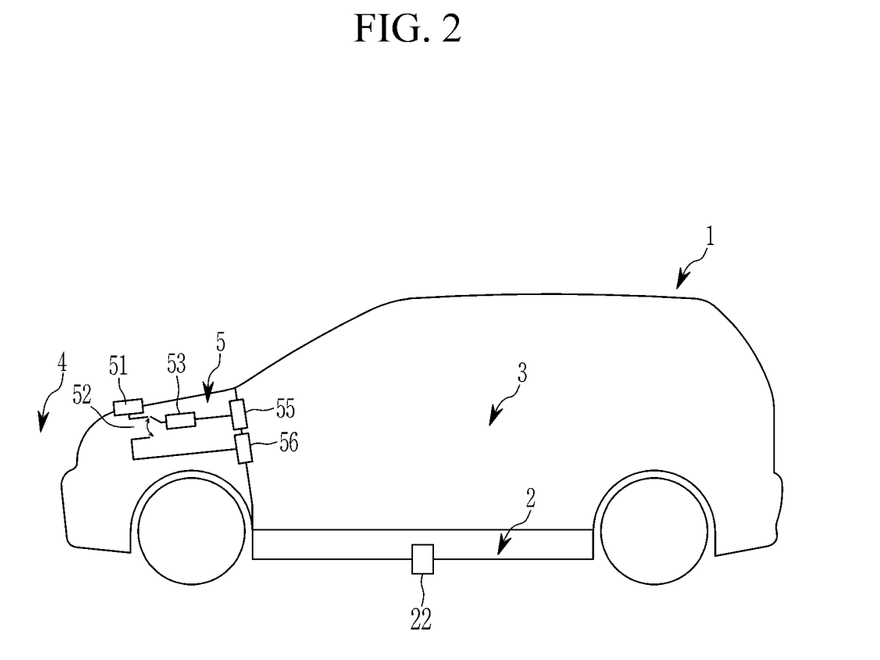
FIG. 2 is a schematic illustration of an electric or hybrid vehicle with a system for preventing the ingestion of contaminated ambient air into a passenger compartment according to an embodiment of the present invention.

FIG. 2 is a schematic illustration of a vehicle including a system for preventing the ingestion of contaminated ambient air into a passenger compartment according to an embodiment of the preset invention.

In addition to the components described above with respect to FIG. 1, the HVAC system 5 according to an embodiment of the present invention further includes an inside inlet (e.g., an inside air inlet) 56 for ingesting air from the interior of the vehicle's passenger compartment 3. The inside inlet 56 is connected, via a switch (e.g., a valve or a switch valve) 52, with the air inflow channel and the fan 53, which is suitable for sucking air, via the inside inlet 56 from the inside of the passenger compartment 3 and supplying the air, via the air inflow channel and the ventilation outlet 55, again into passenger compartment 3, when the switch 52 is in a state connecting the fan 53 with the inside inlet 56.

In a normal operation mode, the switch 52 does not connect the fan 53 with the inside inlet 56 but instead connects the fan 53 with the outside inlet 51 to draw in ambient air 4 from the outside of the vehicle 1. This operation mode (the "normal operation mode") substantially corresponds to the operation described above with respect to FIG. 1 in the context of the related art. However, in the system according to embodiments of the present invention, the switch 52 may be switched to connect the fan 53 with the inside inlet 56 as described above. When the switch 52 is in this state, the HVAC system 5 runs (or operates) in a "recirculation mode" in which an air stream is established in the passenger compartment 3 of the vehicle 1 by ingesting air via the inside inlet 56 from the passenger compartment 3 and supplying air via the ventilation outlet 55 to the passenger compartment 3 such that air exchange with the ambient air 4 is inhibited (or substantially inhibited).

The HVAC system 5 may be operated in the "recirculation mode" any time it is undesirable to have air exchange between the air in the passenger compartment 3 and the ambient air 4. For example, it is undesirable to have such an air exchange when the ambient air is contaminated with combustion gas (or vent-gas) ejected (or emitted) from the battery pack 2 in case of a thermal runaway or even a battery fire occurring in the battery pack 2 of the vehicle 1 for the reasons described above.

In the system and the method according to embodiments of the present invention, it is detected whether or not (e.g., it is determined if) the battery pack 2 (e.g., at least one of the batteries included in the battery pack 2) is in or enters an abnormal or dangerous state. An abnormal or dangerous state is, for example, any state of the battery pack or at least one of its batteries in which the probability of a thermal runaway or a battery fire exceeds a reference (or predetermined) threshold value. Of course, this includes the case when a thermal runaway or even a battery fire in the vehicle's battery pack 2 has already occurred.

Figure 3:
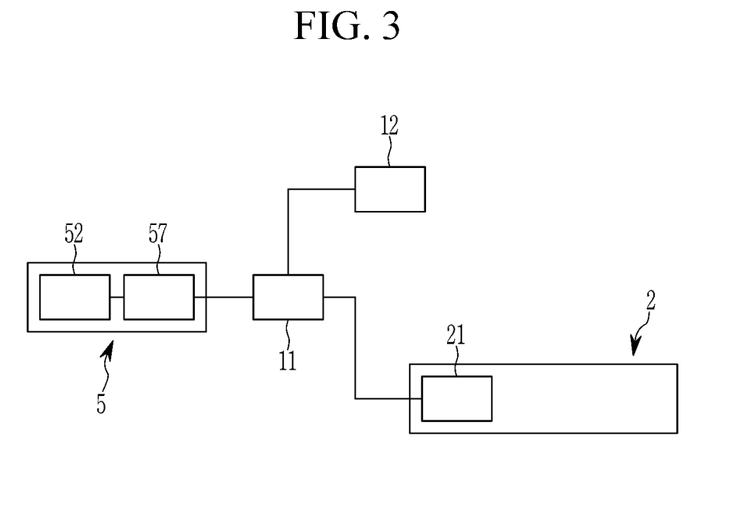
FIG. 3 is a schematic illustration of a system for preventing the ingestion of contaminated ambient air into a passenger compartment according to an embodiment of the present invention.

To that end, the state of the battery pack is monitored (e.g., permanently or continuously monitored) by the BMU 21 as shown in FIG. 3. FIG. 3 is a schematic illustration of an embodiment of the system according the present invention for preventing the ingestion of contaminated ambient air into a passenger compartment of an electric or hybrid vehicle. If the BMU 21 detects an abnormal or dangerous state in the battery pack as described above by, for example, measuring the temperature of the battery pack (or of the battery cells) by using temperature sensors, the BMU 21 sends a first signal (e.g., a first warning signal) to a central control unit (CCU) 11 of the vehicle 1.

Figure 4:
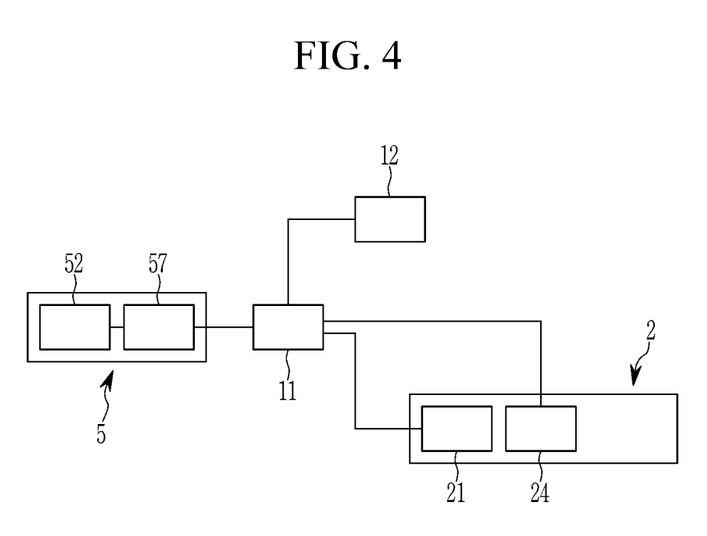
FIG. 4 is a schematic illustration of a system for preventing the ingestion of contaminated ambient air into a passenger compartment according to another embodiment of the present invention.

When the CCU 11 is informed about the abnormal or dangerous state of the battery pack 2 (e.g., when the CCU 11 receives the first signal), it starts one or a series of suitable operations. According to embodiments of the present invention, the CCU 11 sends a second signal (e.g., a second warning signal) to at least the HVAC control unit 57 to trigger the it (e.g., to trigger the switch 52) to switch into the recirculation mode Additionally, as illustrated in FIG. 4, the CCU 11 may also send a third signal (e.g., a third warning signal) to an HVAC system 24 of the battery pack 2 and/or to an extinguishing system to extinguish any possible fire. When the HVAC system 24 of the battery pack 2 receives the third signal from the CCU 11, the HVAC system 24 of the battery pack 2 may cool the battery cells. The HVAC system 24 of the battery pack 2 is generally different and independent from the HVAC system 5 for the passenger compartment 3.

Additionally, the CCU 11 may also trigger one or more alarms in the passenger compartment 3 to prompt alarm(s) 12 (e.g., warning signals) therein so as to warn and inform passengers about the abnormal or dangerous state of the battery pack 2. The alarm(s) may occur in the form of visible/optical signals, such as lighting up an LED or a warning message or symbol on the vehicle's dashboard or elsewhere in the passenger compartment. Alternatively or additionally to the visible/optical alarm(s), the alarm(s) may also occur in form of audible/acoustical signals, such as a beep or a spoken message audible in the passenger compartment 3. The passengers may then decide to stop and leave the car as soon as it is possible.

Additionally, alarm(s) may also occur so as to be perceptible in the environment around the vehicle 1. This way, people in the vicinity of the vehicle 1 can be warned. For example, the driver of a following car may be warned and may then increase the driving distance between the vehicle 1 or stop his car.

The CCU 11 may also put the vehicle 1 in an emergency mode.

For example, one or more filters 54 may be activated. The one or more filters 54 may be arranged in the connection between (e.g., in a duct between) the fan 53 and the ventilation outlet 55 (as shown in FIG. 2) and/or between the inside inlet 56 and the switch 52 and/or the switch 52 and the fan 53. The filter(s) 54, which filter the recirculated air when the HVAC system 5 operates in the recirculation mode, may filter out vent-gas, or at least certain components of such vent-gas, that has already—maybe unnoticed by the passengers—entered the passenger compartment 3.

Upon receiving the second signal from the CCU 11, the HVAC control unit 57 then controls the switch 52 to switch into a state in which the fan 53 is connected with the inside inlet 56. Of course, this step may be omitted, if and only if the switch 52 is already in the state connecting the fan 53 with the inside inlet 56. In other words, as soon as an abnormal or dangerous state is detected in the battery pack 2, the vehicle 1 automatically switches the air conditioning system into air recirculation mode, thus preventing (or substantially reducing or preventing) any toxic gas emitted from the battery pack 2 from entering into the passenger compartment 3, thereby increasing the safety of the passengers of the vehicle 1.

SOME REFERENCE NUMERALS 1 vehicle (e.g., a car)
2 battery pack
3 passenger compartment
4 ambient air
5 HVAC system for the passenger compartment
11 central control unit (CCU) of the vehicle
12 alarm
21 battery management unit (BMU)
22 venting port of the battery pack
24 HVAC system of the battery pack
51 outside inlet
52 switch valve
53 fan
54 filter(s)
55 ventilation outlet
56 inside inlet
57 HVAC control unit

What is claimed is:

1. A method for preventing ingestion of contaminated ambient air into a passenger compartment of a vehicle, the vehicle comprising: a passenger compartment; a battery pack comprising a plurality of batteries; a battery management unit; a central control unit; and a heating, ventilation, and air conditioning (HVAC) system for the passenger compartment, the HVAC system comprising: a heating, ventilation, and air conditioning (HVAC) control unit; an outside inlet configured to ingest ambient air; an air inflow channel; and an inside inlet configured to ingest air from inside of the passenger compartment, the method comprising:

detecting, by the battery management unit, whether at least one of the batteries of the battery pack is in or enters into an abnormal or dangerous state;

transmitting, by the battery management unit, a first signal to the central control unit upon the detection of the abnormal or dangerous state;

transmitting, by the central control unit upon receiving the first signal, a second signal to the HVAC control unit; and switching, by the HVAC control unit upon receiving the second signal and when the air inflow channel is connected to the outside inlet, the air inflow channel from being connected to the outside inlet to being connected to the inside inlet.

2. The method according to claim 1, further comprising stopping, after the switching of the air inflow channel to the inside inlet, the HVAC system.

3. The method according to claim 1, further comprising sending, by the central control unit after receiving the first signal, a third signal to an HVAC system of the battery pack to cool the batteries and/or to an extinguishing system to extinguish any possible fire.

4. The method according to claim 1, further comprising outputting, after the detection of at least one of the batteries of the battery pack being in or entering into the abnormal or dangerous state, an alarm in the passenger compartment.

5. The method according to claim 4, wherein the alarm outputted in the passenger compartment comprises a visible alarm and/or an audible alarm.

6. A system for preventing ingestion of contaminated ambient air into a passenger compartment of a vehicle comprising a battery pack comprising a plurality of batteries, the system comprising:
   a battery management unit;
   a central control unit; and
   a heating, ventilation, and air conditioning (HVAC) system for the passenger compartment, the HVAC system comprising:
      a heating, ventilation, and air conditioning (HVAC) control unit;
      an outside inlet configured to ingest ambient air;
      an air inflow channel; and
      an inside inlet configured to ingest air from an interior of the passenger compartment, the HVAC system being configured to be switched between a state of being connected to the outside inlet and a state of being connected to the inside inlet,
   wherein:
   the battery management unit is configured to detect when at least one of the batteries of the battery pack is in or enters into an abnormal or dangerous state and to transmit, upon detection of the abnormal or dangerous state, a first signal to the central control unit,
   the central control unit is configured to transmit, upon receiving the first signal, a second signal to the HVAC control unit, and
   the HVAC control unit is configured to switch, upon receiving the second signal and when the air inflow channel is connected to the outside inlet, the air inflow channel from being connected to the outside inlet to being connected to the inside inlet.

7. The system according to claim 6, wherein the HVAC system further comprises a switch in the air inflow channel and configured to switch the air inflow channel between being connected to the outside inlet and being connected to the inside inlet.

8. The system according to claim 7, wherein the switch is a switch valve.

9. The system according to claim 7, wherein the switch comprises:
   a first valve configured to open and close a connection of the outside inlet to the air inflow channel; and
   a second valve configured to open and close a connection of the inside inlet to the air inflow channel,
   wherein in one state of the switch, the first valve is opened to connect the outside inlet to the air inflow channel and the second valve is closed to cease connection of the inside inlet to the air inflow channel, and
   wherein in another state of the switch, the first valve is closed to cease connection of the outside inlet to the air inflow channel and the second valve is opened to connect the inside inlet to the air inflow channel.

10. The system according to claim 6, wherein the HVAC system further comprises one or more of:
    a filter configured to filter pollutants and/or toxic substances out of air drawn into the air inflow channel;
    a fan configured to suck air through the air inflow channel; and
    a ventilation outlet configured to supply air into the passenger compartment from the air inflow channel.

11. The system according claim 6, wherein the HVAC control unit is configured to stop the HVAC system after a connection of the air inflow channel to the inside inlet has been established.

12. The system according to claim 11, wherein the battery pack comprises an HVAC system, and
    wherein the HVAC system of the battery pack is configured to receive a signal from the central control unit and to cool, after receiving the signal from the central control unit, the batteries.

13. The system according to claim 6, wherein the battery pack comprises an extinction system, and
    wherein the extinction system of the battery pack is configured to receive a signal from the central control unit and to extinguish, after receiving the signal from the central control unit, any possible fire in the battery pack.

14. The system according to claim 6, further comprising an alarm in the passenger compartment,
    wherein the alarm is configured to output, after the detection of at least one of the batteries of the battery pack being in or entering into the abnormal or dangerous state, an alarm in the passenger compartment.

15. The system according to claim 14, wherein the alarm is configured to output a visible alarm and/or an audible alarm.

* * * * *